(12) United States Patent
Lisi et al.

(10) Patent No.: US 11,190,050 B2
(45) Date of Patent: Nov. 30, 2021

(54) INDUCTIVE POWER TRANSMITTER

(71) Applicant: Apple Inc., Cupertino, CA (US)

(72) Inventors: Gianpaolo Lisi, Cupertino, CA (US); Madhusudanan Keezhveedi Sampath, Cupertino, CA (US); Nan Liu, Cupertino, CA (US); Tianqi Li, Cupertino, CA (US); YiBo Liu, Cupertino, CA (US); Yasin Aalipour, Cupertino, CA (US)

(73) Assignee: Apple Inc., Cupertino, CA (US)

(*) Notice: Subject to any disclaimer, the term of this patent is extended or adjusted under 35 U.S.C. 154(b) by 60 days.

(21) Appl. No.: 16/213,852

(22) Filed: Dec. 7, 2018

(65) Prior Publication Data

US 2020/0083746 A1 Mar. 12, 2020

Related U.S. Application Data

(60) Provisional application No. 62/728,678, filed on Sep. 7, 2018.

(51) Int. Cl.
*H02J 50/12* (2016.01)
*H02J 7/02* (2016.01)
*H01F 38/14* (2006.01)
*H02J 5/00* (2016.01)

(52) U.S. Cl.
CPC .............. *H02J 50/12* (2016.02); *H01F 38/14* (2013.01); *H02J 5/005* (2013.01); *H02J 7/025* (2013.01); *H01F 2038/143* (2013.01)

(58) Field of Classification Search
CPC . H02J 50/12; H02J 5/005; H02J 7/025; H01F 38/14
USPC ........................................................ 307/104
See application file for complete search history.

(56) References Cited

U.S. PATENT DOCUMENTS

| | | | |
|---|---|---|---|
| 10,374,461 B2* | 8/2019 | Shimokawa | H02J 7/025 |
| 2013/0193914 A1* | 8/2013 | Gaddam | A61N 1/3787 |
| | | | 320/108 |
| 2017/0005523 A1* | 1/2017 | Widmer | B60L 53/36 |
| 2018/0102663 A1* | 4/2018 | Jung | H02M 3/33507 |
| 2019/0379230 A1* | 12/2019 | Wu | H02J 7/027 |

* cited by examiner

*Primary Examiner* — Michael R. Fin
(74) *Attorney, Agent, or Firm* — Fletcher Yoder PC

(57) ABSTRACT

An inductive power transmitter is provided that includes a power transmitting coil which includes transmission circuitry coupled to the power transmitting coil. The inductive power transmitter is configured to produce an inductive power transfer (IPT) signal having an IPT power so that the power transmitting coil generates an IPT field to transfer wireless power to a power receiving coil of an inductive power receiver. The inductive power transmitter includes detection circuitry coupled to the transmission circuitry and is configured to detect one or more indications of a magnetic field strength of a leakage IPT field. The inductive power transmitter includes control circuitry configured to control the transmission circuitry while the transmission circuitry is increasing the IPT power towards a charge level sufficient to charge a battery associated with the inductive power receiver at a target charge rate.

18 Claims, 4 Drawing Sheets

INDUCTIVE POWER TRANSMITTER

FIELD

This relates generally to an inductive power transmitter, and, more particularly, to an inductive power transmitter configured to detect an indication of a magnetic field strength.

BACKGROUND

In inductive power systems, an inductive power transmitter wirelessly transmits power to an inductive power receiver. The inductive power receiver receives the wirelessly transmitted power and provides power, for example, to charge an internal battery of an associated device or to power an associated device.

Inductive power transmitters may include one or more transmitting coils which generate a magnetic field (i.e., an H-field) and define a charging region. Provided one or more receiving coils of the inductive power receiver are located in sufficient proximity to the charging region and within the magnetic field, wireless power transfer may be achieved.

Unless the inductive power transmitter and inductive power receiver are ideally coupled (i.e., there is a coupling factor or coupling coefficient, k, of 1), some of the magnetic field will leak into the nearby environment. This may also be known as the leakage H-field. This may arise for example due to misalignment of the inductive power transmitter and inductive power receiver or some other reason.

Regulatory bodies (for example, the Federal Communications Commission) may provide a maximum allowable strength or amount of leakage H-field for a transmitting device or class of transmitting devices. It is therefore desirable to ensure that the strength or amount of the leakage H-field of an inductive power transmitter does not exceed such a maximum limit.

DETAILED DESCRIPTION

Figure 1:
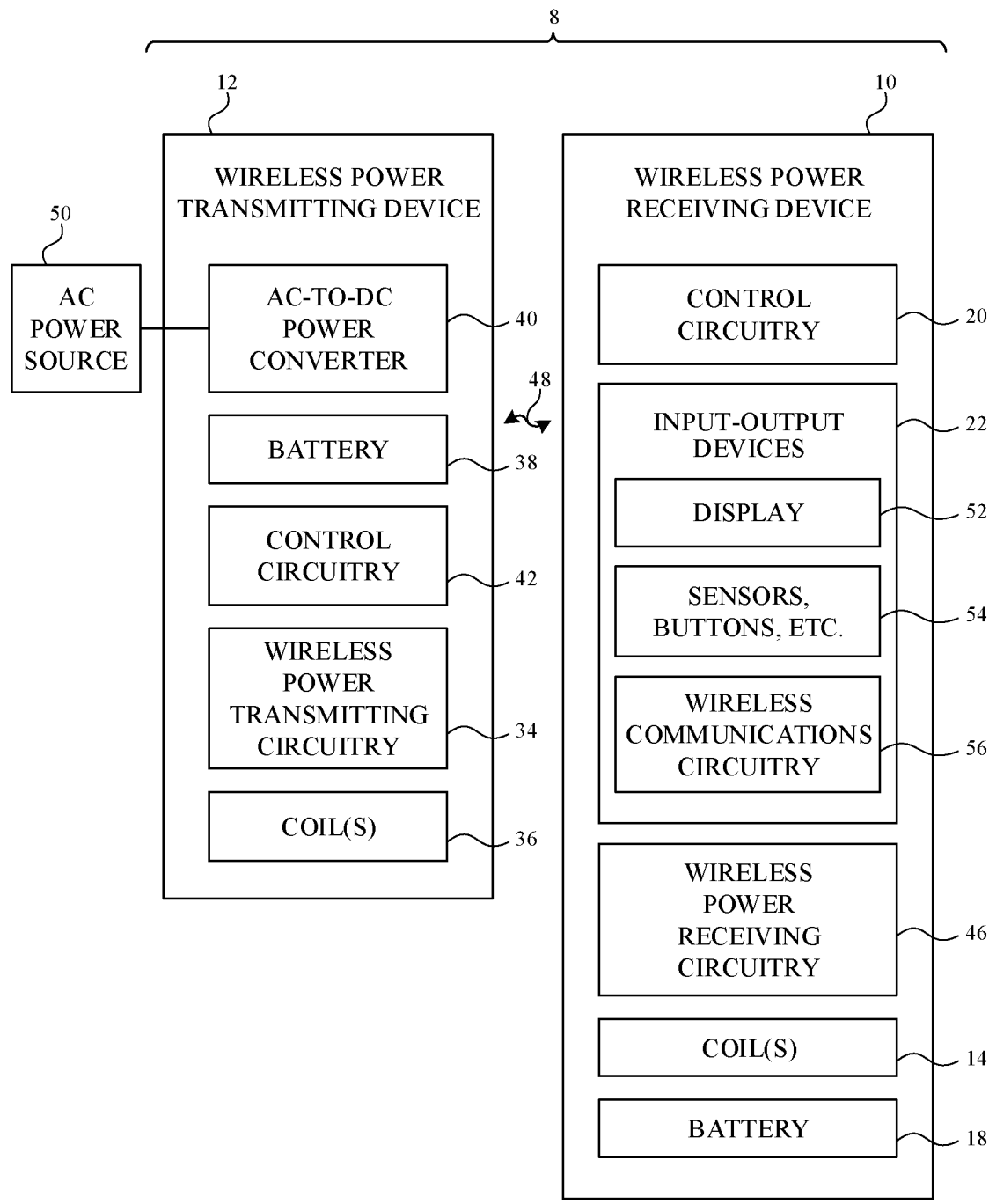
FIG. 1 is a schematic diagram of an illustrative wireless power system in accordance with some embodiments.

A wireless power system has a wireless power transmitting device (which may also be referred to in some instances as an inductive power transmitter) that transmits power wirelessly to a wireless power receiving device (which may also be referred to in some instances as an inductive power receiver). The wireless power transmitting device is a device such as a wireless charging mat, wireless charging puck, wireless charging stand, wireless charging table, or other wireless power transmitting equipment. The wireless power transmitting device may be a stand-alone device or built into other electronic devices such as a laptop or tablet computer, cellular telephone or other electronic device. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, electronic pencil or stylus, other portable electronic device, or other wireless power receiving equipment.

During operation, the wireless power transmitting device supplies alternating-current signals to one or more wireless power transmitting coils. This causes the coils to generate an alternating magnetic field and to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Wireless power transmitting and receiving devices can be designed to cooperate specifically with each other. For example, the size, shape, number, dimensions and configuration of coils of one or both of the devices may be selected based on the other device. Magnetic elements may also be included in the transmitting and/or receiving device, and the size, shape, number, dimensions and configuration of the magnetic elements may be selected based on the other device.

In some cases, wireless power transmitting and receiving devices can be designed to be closely coupled to each other. Typically, this is achieved by arranging the coils of the transmitting and receiving devices such that they are aligned with and close to each other in use. Systems in which the transmitting and receiving devices can be closely coupled to each other in use are sometimes referred to as inductive power transfer systems. Transmitting and receiving devices that can be closely coupled to receiving devices can be referred to as inductive power transfer devices.

Wireless power transmitting and receiving devices can also be designed to cooperate with each other in particular orientations, positions or other spatial relationships. For example, some receiving devices may have a preferred position or orientation with respect to a transmitting device. This preferred position or orientation may allow for good power transfer, minimum leakage of the magnetic field and other advantageous effects. The transmitting and/or receiving devices may have visual markings to indicate where or in what orientation to place the receiving device, engaging elements to hold the receiving device in a particular position or orientation, magnetic couplings or other biasing elements to urge the receiving device towards a particular position or orientation, or other arrangements.

Wireless power transmitting and receiving devices can also be used with other devices without being specifically designed to cooperate with them. For example, a wireless power transmitting device can operate with many different types of receiving devices having different coil arrangements, different (or no) magnetic elements, sizes, shapes and other characteristics. A wireless power receiving device can operate with many different types of transmitting devices having different coil arrangements, different (or no) magnetic elements, sizes, shapes and other characteristics.

Wireless power transmitting and receiving devices can also be used in various orientations, positions or other spatial relationships. For example, wireless power transmitting or receiving devices may be provided without visual markings, engaging elements, magnetic couplings or other biasing elements, or other arrangements. Alternatively, transmitting or receiving devices may have these arrangements but still operate in various other orientations and positions.

The term "coil" may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes. Other configurations may be used depending on the application. The use of the term "coil", in either singular or plural, is not meant to be restrictive in this sense.

An illustrative wireless power system is shown in FIG. 1. As shown in FIG. 1, a wireless power system 8 includes a wireless power transmitting device (which may also be referred to in some instances as an inductive power transmitter) 12 and one or more wireless power receiving devices such as wireless power receiving device (which may also be referred to in some instances as an inductive power receiver) 10. Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. For example, in one embodiment electronic device 10 is a tablet computer and electronic device 12 is a stylus configured to attach to electronic device (tablet) 10 and be wirelessly (e.g., inductively) charged by electronic device (tablet) 10. Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to generate an alternating magnetic field and to transmit alternating-current wireless power signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time varying magnetic field (wireless power signals 48) or "flux" is generated, that is received by one or more corresponding coils 14 electrically connected to wireless power receiving circuitry 46 in receiving device 10. If the time varying magnetic field is magnetically coupled to coil 14, an AC voltage is induced and a corresponding AC currents flows in coil 14. Rectifier circuitry in circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analogue circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in sensing for foreign or other non receiver objects (e.g.: metallic objects such as coins or RFID tags within electronic devices), determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example, device 12 and/or device 10 may communicate using in-band communications injected or combined into the wireless power signals 48 such as proposed in the Wireless Power Consortium Qi specification 1.1, which is incorporated herein by reference. Alternatively, a separate Bluetooth®, RFID, NFC, Zigbee, WiFi, RF or other communication system may be employed.

Figure 2:
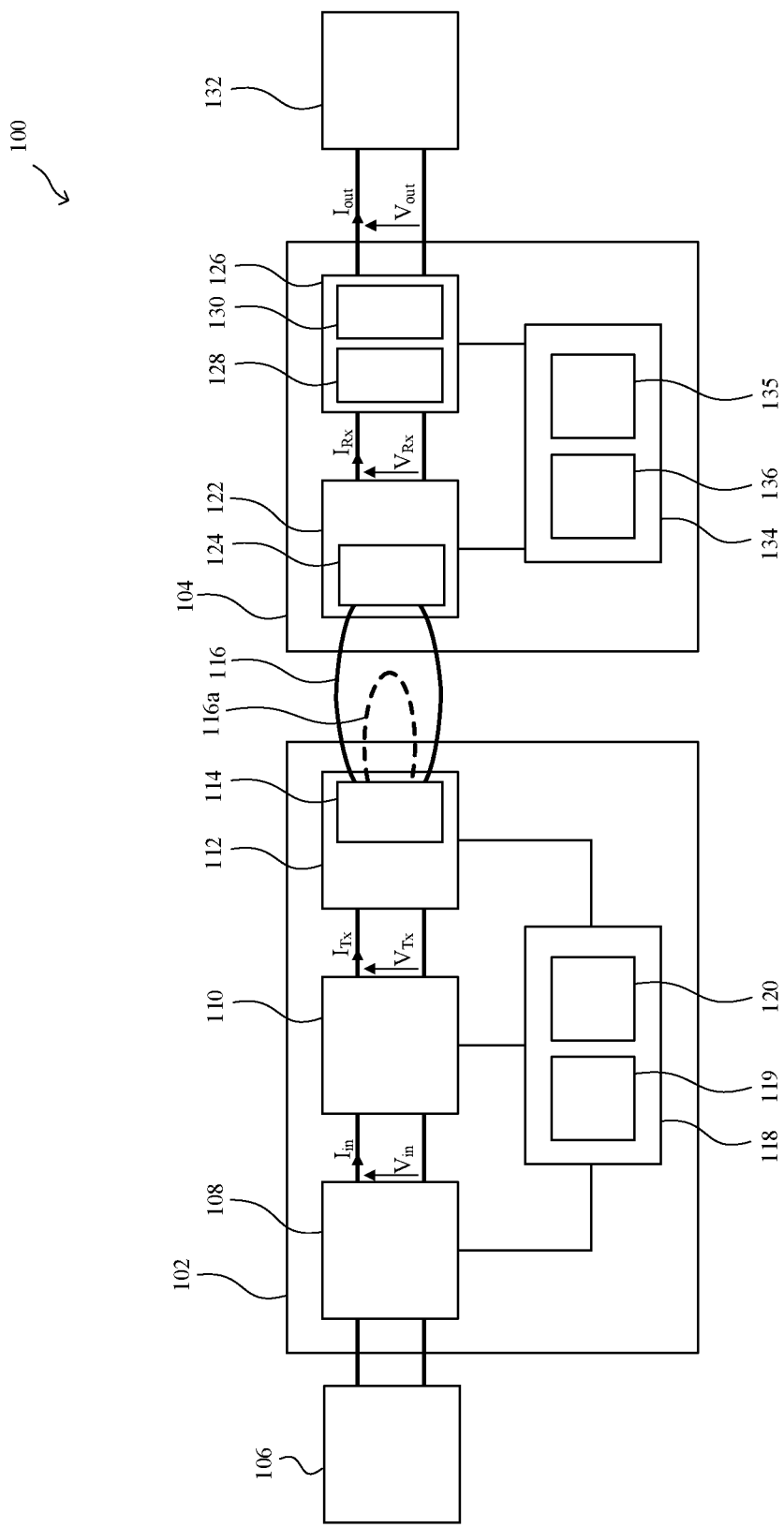
FIG. 2 is a schematic diagram of an illustrative inductive power system in accordance with some embodiments.

FIG. 2 illustrates a block circuit diagram of an example inductive power transfer system 100 including an inductive power transmitter 102 and inductive power receiver 104. The inductive power transmitter 102 may be part of, or associated with, an electronic device, such as for example, a laptop or tablet computer. The inductive power receiver 104 may be part of, or associated with, a portable electronic device, such as, for example, a stylus or mobile phone. The inductive power transmitter 2 is connected to a power source 106 (such as mains power or a battery of the associated electronic device). The inductive power transmitter 102 may include a converter 108 (for example, an AC-DC converter, depending on the type of power source 106) and transmission circuitry 110 (which may, for example, include an inverter). The converter 108 may supply DC power to the transmission circuitry 110 with input power, $P_{in}$, input voltage, $V_{in}$, and input current, $I_{in}$.

The transmission circuitry 110 is coupled to an impedance network 112. The impedance network 112 includes one or more power transmitting coils 114. The impedance network 112 may also include capacitors (not shown). The capacitors may be connected to the transmitting coil(s) 114 either in parallel or series to create a resonant circuit. The transmission circuitry 110 produces an AC inductive power transfer (IPT) signal with IPT power, $P_{Tx}$, transmitting voltage, $V_{Tx}$, and transmitting current, $I_{Tx}$. The IPT signal may have a fixed frequency or variable frequency. The IPT signal is supplied to the impedance network 112 such that the transmitting coil(s) 114 generate an IPT field (i.e., alternating magnetic field) 116. The IPT field 116 may include leakage IPT field 116a (represented by a dashed line). While FIG. 2 shows the impedance network 112 as distinct from the transmission circuitry 110, in some configurations, the impedance network 112, or parts of thereof, may also be considered to be part of the transmission circuitry 110 (for example, transmitting coils may be part of an inverter). Where there are two or more transmitting coils 114, they may be able to be selectively energized. Transmission circuitry 110 may include two or more inverters each coupled to one or more transmitting coils, with each inverter able to be selectively energized.

The inductive power transmitter 102 also includes control circuitry 118. The control circuitry 118 may be connected to each part of the inductive power transmitter 102. The control circuitry 118 may be configured to receive inputs from each part of the inductive power transmitter 102 and produce outputs that control the operation of the inductive power transmitter 102.

Control circuitry 118 includes detection circuitry 119 configured to detect parameters associated with the operation of the inductive power transfer system 100, inductive power transmitter 102, and/or inductive power receiver 104. For example, detection circuitry 119 may be configured to detect $V_{in}$, $I_{in}$, $V_{Tx}$, $I_{Tx}$, $P_{Tx}$, $V_{Rx}$ (introduced below), $I_{Rx}$ (introduced below), $V_{out}$ (introduced below), $I_{out}$ (introduced below), and/or an indication of the strength of the IPT field 116 or leakage IPT field 116a. As will be described in more detail below, the detection circuitry 119 may detect an efficiency parameter, indicative of the efficiency of wireless power transfer between the inductive power transmitter 102 and the inductive power receiver 104. In FIG. 2 detection circuitry 119 is shown as part of control circuitry 118, however it may also be considered as distinct from, and possibly controlled by, control circuitry 118. Parameters associated with inductive power receiver 104 may also be communicated to detection circuitry 119 via communications circuitry 120 (described below).

Control circuitry 118 may also include communications circuitry 120 configured to transmit and/or receive communication signals. In FIG. 2 the communications circuitry 120 is shown as part of control circuitry 118, however it may also be considered as distinct from, and possibly controlled by, control circuitry 118. Communications circuitry 120 may also include further communications components (for example, dedicated communication coils) which the communications circuitry 120 uses to communicate and/or the communications circuitry 120 may use other parts of the inductive power transmitter 102 to effect communication (for example, transmitting coils 114 for in-band type communications).

The inductive power receiver 104 includes a receiving impedance network 122. The receiving impedance network 122 includes one or more power receiving coils 124. The receiving impedance network 122 may also include capacitors (not shown). The capacitors may be connected to the receiving coil(s) 124 either in parallel or series to create a resonant circuit. When the inductive power transmitter 102 and the inductive power receiver 104 are suitably coupled, the IPT field 116 generated by the transmitting coil or coils 114 induces an alternating current in the receiving coil or coils 124, thereby transferring wireless power from the inductive power transmitter 102 to the inductive power receiver 104.

The receiving impedance network is connected to receiving circuitry 126, supplying AC power with receiving voltage, $V_{Rx}$, and receiving current, $I_{Rx}$. Receiving circuitry 126 may include, for example, rectifying circuitry 128 and regulating circuitry 130. Receiving circuitry 126 is connected to a load 132, supplying the load with DC power having output power, $P_{out}$, output voltage, $V_{out}$, and output current, $I_{out}$. The load 132 may include, for example, powering an associated portable electronic device or charging circuitry connected to a battery of a portable electronic device associated with the inductive power receiver 104.

The inductive power receiver 104 may include control circuitry 134. The control circuitry 134 may be connected to each part of the inductive power receiver 104. The control circuitry 134 may be configured to receive inputs from each part of the inductive power receiver 104 and produce outputs that control the operation of the inductive power receiver 104.

Control circuitry 134 includes detection circuitry 135 configured to detect parameters associated with the operation of the inductive power transfer system 100, inductive power transmitter 102, and/or inductive power receiver 104. For example, detection circuitry 135 may be configured to detect $V_{Rx}$, $I_{Rx}$, $V_{out}$, $I_{out}$, and/or an indication of the strength of the IPT field 116 or leakage IPT field 116a. In FIG. 2 detection circuitry 135 is shown as part of control circuitry 134, however it may also be considered as distinct from, and possibly controlled by, control circuitry 134. Parameters associated with inductive power receiver 104 may also be detected by detection circuitry 135 and then communicated to the inductive power transmitter 102 via communications circuitry 136 (described below).

Control circuitry 134 may also include communications circuitry 136 configured to transmit and/or receive communication signals. In FIG. 2 the communications circuitry 136 is shown as part of control circuitry 134, however it may also be considered as distinct from, and possibly controlled by, control circuitry 134. Communications circuitry 136 may also include further communications components (for example, dedicated communication coils) which the communications circuitry 136 uses to communicate and/or the communications circuitry 136 may use other parts of the inductive power receiver 104 to effect communication (for example, receiving coils 124 for in-band type communications).

Figure 3:
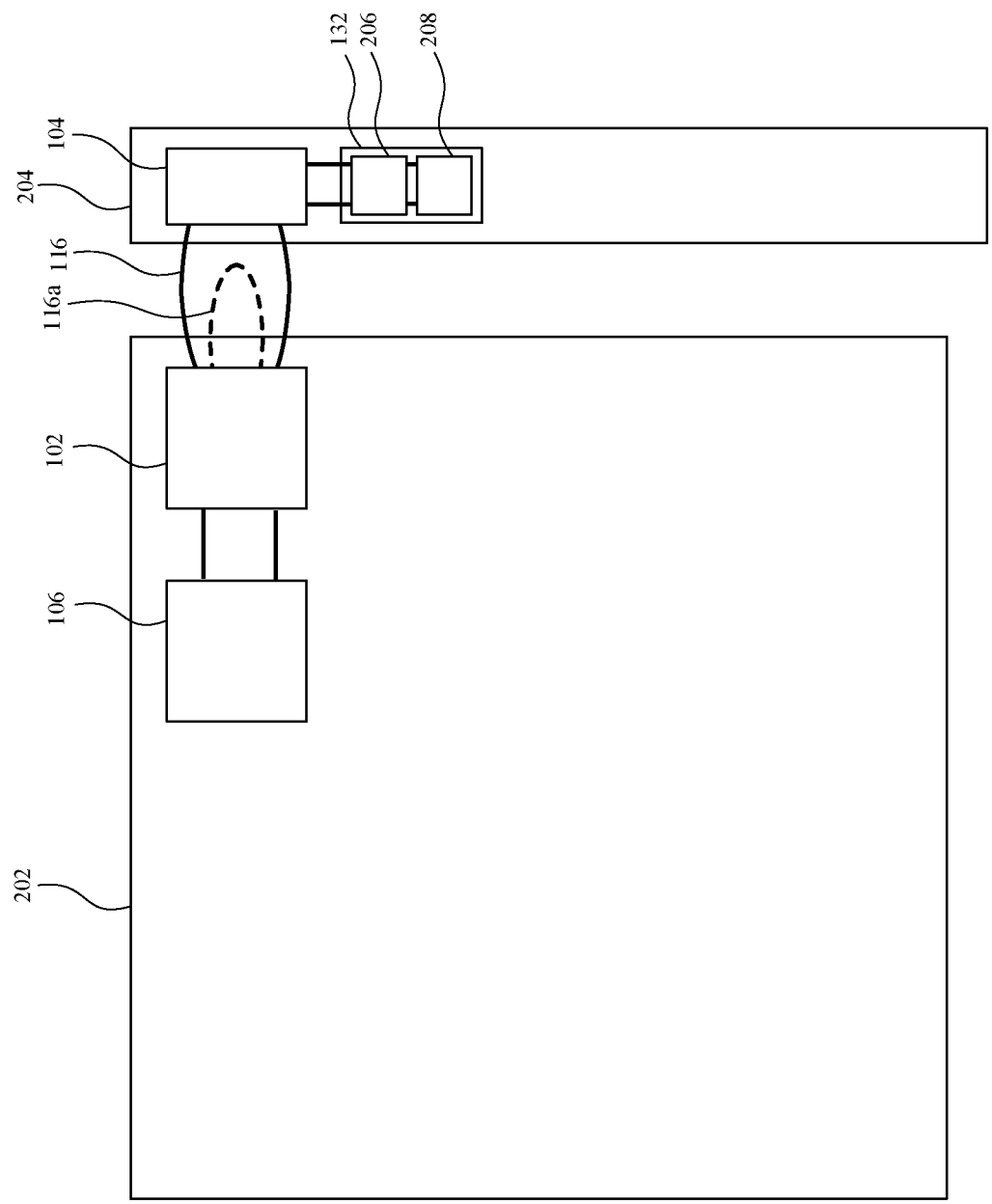
FIG. 3 is a schematic diagram of an electronic device and a portable electronic device in accordance with some embodiments.

FIG. 3 illustrates electronic device 202 having the inductive power transmitter 102 of FIG. 2. Electronic device 202 is capable of transmitting wireless power charging signals to an external device. FIG. 3 also illustrates portable electronic device 204 having the inductive power receiver 104 of FIG. 2. In this embodiment, the load 132 includes charging circuitry 206 and battery 208 associated with the portable electronic device 204. In one embodiment electronic device 202 is a tablet computer and portable electronic device 204 is a stylus configured to attach to electronic device (tablet) 202 and be wirelessly (e.g., inductively) charged by electronic device (tablet) 202. FIG. 3 also illustrates the IPT field 116 and leakage IPT field 116a that may exist between the electronic device 202 and portable electronic device 204 during wireless power transfer.

As previously described, the electronic device 202/inductive power transmitter 102 and portable electronic device 204/inductive power receiver 104 may be configured to communicate with each other. For example, the inductive power transmitter 102 and inductive power receiver 104 may be enabled with in-band communication, using the transmitter and receiver can exchange relevant parameters. The electronic device 202 and portable electronic device 204 may also use this communication link to communicate, and/or may communicate directly via other channels.

As previously mentioned, the electronic device 202 and/or the portable electronic device 204 may be configured to encourage a preferred position or relative orientation or range of positions or relative orientations. For example, either device may have visual markings to indicate where or in what orientation to place the portable electronic device 204, either device may include engaging elements to hold the portable electronic device 204 in a particular position or orientation relative to the electronic device 202, and/or either device may include magnetic couplings or other biasing elements to urge the portable electronic device 204 towards the preferred position or orientation relative to the electronic device.

While in the preferred position or orientation, the amount or strength of the leakage IPT field may fall within expected limits during wireless power transfer (since the coupling will be relatively predictable). The inductive power transmitter and inductive power receiver may be configured such that during wireless power transfer within expected or normal operating conditions, the leakage IPT field does not exceed relevant allowable limits (for example, allowable limits defined by regulatory bodies). However, if there is misalignment between the inductive power transmitter and inductive power receiver (for example, the portable electronic device 204 is partially disengaged from the electronic device 202 during power transfer), or some othering change in operating conditions, the amount of leakage IPT field may no longer be within the allowable limits.

Having described the inductive power system 100, its operation to prevent or reduce excess leakage IPT field will now be described using the example embodiment of electronic device 202 charging the battery 208 of portable electronic device 204.

Charging may involve a series of charging states, corresponding to different rates of charging.

To begin, the inductive power transmitter 102 of electronic device 202 may be in a pre-charge state. During the pre-charge state, minimal or no power is supplied to the transmitting coils 114 by the transmission circuitry 110. The portable electronic device 204 may not be present or may not need charging. The inductive power transmitter 102 may be in a detection mode and may be configured to detect the presence of a suitable inductive power receiver, for example, by periodically pinging for nearby receivers. Upon detecting an inductive power receiver or otherwise, the inductive power transmitter 102 and inductive power receiver 104 may exchange information according to a suitable handshake process. Such handshake process may include, for example, verifying the compatibility of the inductive power transmitter 102 and inductive power receiver 104, exchanging information about the type of transmitter and receiver and acceptable modes of power transfer, and exchanging information about the battery charge status of the portable electronic device 204. The inductive power receiver 104 may issue a request to begin charging or the inductive power transmitter may otherwise determine that charging should begin.

Upon beginning charging, the inductive power transmitter 102 enters a ramp up state. During the ramp up state, the control circuitry 118 controls the converter 108 and/or the transmission circuitry 110 to increase the power, $P_{Tx}$, of the IPT signal produced by the transmission circuitry 110 such that the strength of the IPT field 116 generated by the transmitting coil 114 is increased. For example, the inverter of transmission circuitry 110 may be controlled to adjust its duty cycle or control its phase-shift to increase the ratio of $V_{Tx}/V_{in}$, while $V_{in}$ is kept minimum, and/or the converter may be controlled to increase $V_{in}$. The rate the duty cycle is increased may be, for example, between 0.01 and 0.5 per 100 ms, 0.05 and 0.3 per 100 ms or about 0.1 per 100 ms. The rate $V_{in}$ is increased may be, for example, between 0.1 and 5V per 100 ms, 0.5 and 3V per 100 ms, or about 2V per 100 ms. The frequency of the input AC signal may also be adjusted to increase the power. As a result, power is wirelessly (e.g., inductively) transferred to the inductive power receiver 104, which in turn supplies DC power to the charging circuitry 206. The charging circuitry 206 also begins to charge the battery 208 at a charge rate, which increases as the power is increased. To prevent load crushing, $V_{out}$ may be increased before $I_{out}$. During the ramp up state, the transmission circuitry 110 continues to increase the power of the IPT signal (and therefore the strength of the IPT field 116) towards a first charge level (i.e., a level of $P_{Tx}$) until a first target charge rate (i.e., the rate the battery 208 is being charged) is reached. For example, the first target charge rate may initially be a "fast charge" rate. The first target charge rate may be for example between about 5 times (5C) and 15 times (15C) standard unit charging rate, 7 times (7C) and 13 times (13C) standard unit charging rate, or about 10 times (10C) standard unit charging rate. During the ramp up state, the transmitter 102 may periodically or at certain power levels receive instructions from the receiver 104 (for example, via in band communications) to continue increasing power until the target charge rate is reached. As will be described in more detail below, during the ramp up state, one or more indications of the magnetic field strength of the leakage IPT field are detected, and if it is determined that one of the indications is inside a respective first range the transmission circuitry may be controlled to continue to increase IPT power, however if it is determined that the indication is outside the respective first range, then the transmission circuitry may be controlled to reduce IPT power to stop providing any input or reduce input voltage and/or power.

Once the target charge rate is reached, the inductive power transmitter 102 enters a first steady state. During the first steady state, the transmission circuitry 110 stops increasing the power of the IPT signal and continues to provide the IPT signal at the charge level. The receiver 104 may detect the charge rate and once the charge rate reaches the target level, the receiver 104 may send an instruction to the transmitter to stop increasing power. For example, the stop instruction may be sent via in-band communications. During the first steady state, the charging circuitry 206 continues to charge the battery 208 at the first target charge rate. The inductive power transmitter 102 may be configured to only be in the first steady state for a certain time period or until the inductive power receiver 104 communicates to the inductive power transmitter 102 to change states. The time period may be set so as to limit exposure of the battery 208 to the high charge rate. As will be described in more detail below, during the first steady state, one or more indications of the magnetic field strength of the leakage IPT field are detected, and if it is determined that one of the indications is outside a respective second range the transmission circuitry may be controlled to stop charging or reduce IPT power, however if it is determined that the indication is inside the respective second range, then the transmission circuitry may be controlled to continue producing the IPT signal with IPT power.

At the conclusion of the first steady state, the inductive power transmitter 102 enters a ramp down state. During the ramp down state, the control circuitry 118 controls the transmission circuitry 110 to decrease the power, $P_{TX}$, of the IPT signal produced by the transmission circuitry 110 such that the strength of the IPT field 116 generated by the transmitting coil 114 is decreased. For example, the inverter of transmission circuitry 110 may be controlled to adjust its duty cycle or control its phase-shift to decrease the ratio of $V_{TX}/V_{in}$, while $V_{in}$ is kept minimum, and/or the converter may be controlled to decrease $V_{in}$. The rate the duty cycle is decreased may be, for example, between 0.01 and 0.5 per 100 ms, 0.05 and 0.3 per 100 ms or about 0.1 per 100 ms. The rate $V_{in}$ is decreased may be, for example, between 0.1 and 5V per 100 ms, 0.5 and 3V per 100 ms, or about 2V per 100 ms. The frequency of the input AC signal may also be adjusted to decrease the power. The charging circuitry 206 begins to charge the battery 208 at a decreased charge rate, which decreases as the power is decreased. To prevent load crushing, $I_{out}$ may be decreased before $V_{out}$. During the ramp down state, the transmission circuitry 110 continues to decrease the power of the IPT signal (and therefore the strength of the IPT field 116) towards a second charge level until a second target charge rate is reached. For example, the second target charge rate may be a "normal" rate. The second target charge rate may be for example between about 1C and 5C, 2C and 4C, or about 2.5C.

Once the second target charge rate is reached, the inductive power transmitter 102 enters a second steady state at the second target charge rate. As with the first steady state, the inductive power transmitter 102 may be configured to only be in the second steady state for a certain time period or until the inductive power receiver 104 communicates to the inductive power transmitter 102 to change states.

At the conclusion of the second steady state, the inductive power transmitter 102 may enter another ramp down state, in which the power is reduced to zero. Following which the inductive power transmitter may enter a post-charge state during which minimal or no power is supplied to the transmitting coils 114 by the transmission circuitry 110.

At any stage, the portable electronic device 204 and inductive power receiver 104 may be decoupled from the electronic device 202 and inductive power transmitter 102. For example, the portable electronic device 204 may be taken away by a user. The inductive power transmitter 102 may detect this change and will enter the post-charge state accordingly.

Figure 4:
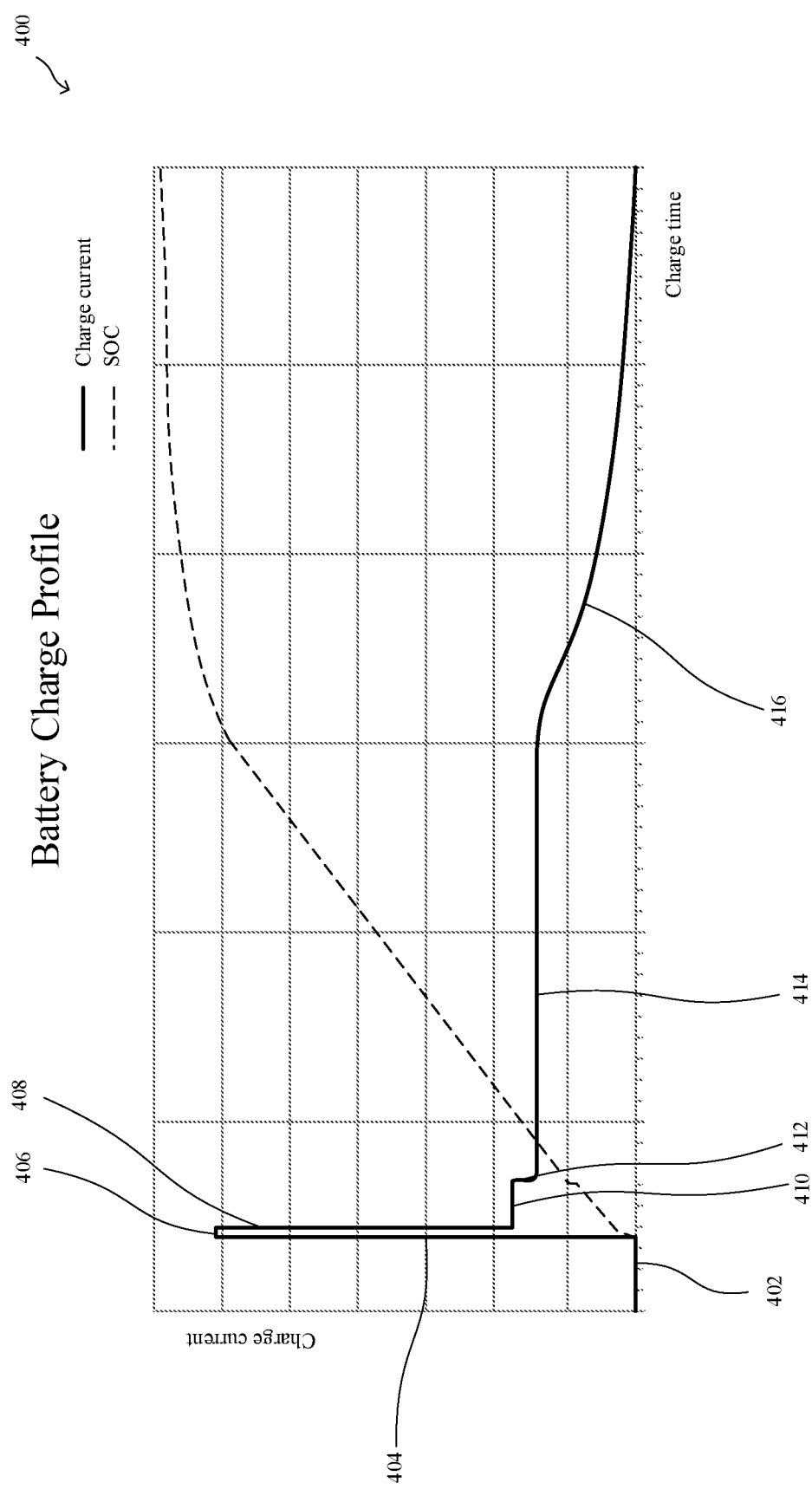
FIG. 4 is a graph illustrating an example charging profile.

An example series of states for fully charging a battery is illustrated in FIG. 4, which shows a charging profile 400. An outline is provided below:

a. Pre-charge state until request for charging received (402)
b. Ramp up state (404)
c. First steady state with a fast charge rate (406)
d. Ramp down state (408)
e. Second steady state with a semi-fast charge rate (410)
f. Ramp down state (412)
g. Third steady state with a normal charge rate (414)
h. Constant voltage charge state until battery fully charged (416)
i. Post-charge state (not shown in FIG. 4)

It has been found that circuit parameters associated with the operation of the inductive power system 100 may be indicative of the strength of leakage IPT field 116a. These circuit parameters may be used to indicate whether the leakage IPT field exceeds an allowable limit. The circuit parameters may include direct circuit parameters (such as a measured current) or indirect circuit parameters (such as an efficiency parameter).

Generally speaking, the detection circuitry 119 is configured to detect one or more indications, where the indications are indicative of the strength of the leakage IPT field 116a (which in turn may be related to the coupling coefficient, k). The indications may comprise one or more circuit parameters, further indications or other indications, as will be described in more detail below. The detection circuitry 119 provides the one or more indications to the control circuitry 118. If the control circuitry 118 determines that at least one of the indications is outside a respective range (suggesting that the leakage IPT field has exceeded an allowable limit), then the control circuitry 118 controls the transmission circuitry 110 to reduce the strength of IPT field 116 (and therefore also the leakage IPT field 116a). The indications may be detected continuously or at periodic intervals. While in the foregoing description the transmitter 102 implements the detection process, in some example embodiments, some or all aspects may be implemented by the receiver 104. For example, the control circuitry 134 of the receiver 104 may determine if indications are outside their respective range, and communicate this back to the transmitter control circuitry 118 In a further example, the receiver 104, upon determining that an indication is outside a range, may control some aspect of the operation of the receiver to reduce leakage IPT field strength—for example, adjusting the load 132 or adjusting the tuning of receiving impedance network 122.

The one or more indications may include an efficiency parameter, where the efficiency parameter is indicative of the efficiency of wireless power transfer between the inductive power transmitter 102 and the inductive power receiver 104. The efficiency parameter may be detected based on a magnitude of the input DC power, $P_{in}$, and a magnitude of the output DC power, $P_{out}$. The efficiency parameter may be the ratio of the magnitude of the output DC voltage, $V_{out}$, output by the receiving circuitry 126 and supplied to the charging circuitry 206 and the input DC voltage, $V_{in}$, supplied to the transmission circuitry 110. As a ratio, the efficiency parameter be between 0% and 100%. Since the efficiency parameter is an indirect parameter and relies on parameters from both the inductive power transmitter 102 (e.g., $P_{in}$, or $V_{in}$) and the inductive power receiver 104 (e.g., $P_{out}$ or $V_{out}$), the relevant receiver circuit parameters may be detected by the receiver detection circuitry 135 and communicated to the transmitter detection circuitry 119 via communications circuitry 136 and 120.

The one or more indications may also include further circuit parameters, for example:
 a. a peak magnitude of the transmitting AC current, $I_{Tx}$, supplied to the transmitting impedance network 112/transmitting coil 114;
 b. an RMS magnitude of the transmitting AC current, $I_{Tx}$, supplied to the transmitting impedance network 112/transmitting coil 114;
 c. a peak magnitude of the receiving AC current, $I_{Rx}$, output by the receiving impedance network 122/receiving coil 124;
 d. an RMS magnitude of the receiving AC current, $I_{Rx}$, output by the receiving impedance network 122/receiving coil 124; and
 e. a magnitude of the output DC current, $I_{out}$, output by the receiving circuitry 126 and supplied to the charging circuitry 206.

As with the efficiency parameter, those parameters associated with the inductive power receiver (e.g., $I_{Rx}$ or $I_{out}$) may be detected by the receiver detection circuitry 135 and communicated to the transmitter detection circuitry 119 via communications circuitry 136 and 120.

The one or more indications are provided to control circuitry 118, following which the control circuitry 118 determines if the indications are inside a respective range. The control circuitry 118 may determine that the indications are inside the respective range if any one or more than one of the indications (including the efficiency parameter) are above/below a respective threshold. Whether the indication must be above or below its respective threshold will depend on the type of indication/circuit parameter. For example:
 a. The efficiency parameter is inside an efficiency range if it is above an efficiency threshold i.e. the efficiency range may be X-100%, where X is the particular efficiency threshold (which threshold may vary as described below). The efficiency threshold may be between 5 to 50%, 20 to 45% or about 30%.
 b. The peak $I_{Tx}$ is inside a peak $I_{Tx}$ range if it is below a peak $I_{Tx}$ threshold i.e. the peak $I_{Tx}$ range may be 0-Y A, where Y is the particular peak $I_{Tx}$ threshold (which threshold may vary as described below). The peak $I_{Tx}$ threshold may be between 0.5 and 2.5 A, 1.0 and 2.0 A, or about 1.5 A.
 c. The RMS $I_{Tx}$ is inside an RMS $I_{Tx}$ range if it is below an RMS $I_{Tx}$ threshold i.e. the RMS $I_{Tx}$ range may be 0-Z A, where Z is the particular RMS $I_{Tx}$ threshold (which threshold may vary as described below). The RMS $I_{Tx}$ threshold may be between 0.3 and 2.0 A, 0.7 and 1.6 A, or about 1.1 A.
 d. The peak $I_{Rx}$ is inside a peak $I_{Rx}$ range if it is below a peak $I_{Rx}$ threshold i.e. i.e. the peak $I_{Rx}$ range may be 0-W A, where W is the particular peak $I_{Rx}$ threshold (which threshold may vary as described below). The peak $I_{Rx}$ threshold may be between 0.04 and 0.7 A.
 e. The RMS $I_{Rx}$ is inside an RMS $I_{Rx}$ range if it is below an RMS $I_{Rx}$ threshold i.e. the RMS $I_{Rx}$ range may be 0-V A, where V is the particular RMS $I_{Rx}$ threshold (which threshold may vary as described below). The RMS $I_{Rx}$ threshold may be between 0.04 and 0.5 A.
 f. $I_{out}$ is inside an $I_{out}$ range if it is below an $I_{out}$ threshold i.e. the $I_{out}$ range may be 0-U A, where U is the particular $I_{out}$ threshold (which threshold may vary as described below). The $I_{out}$ threshold may be between 50 and 450 mA, 150 and 350 mA or about 250 mA.

In some embodiments, a particular combination of ranges/thresholds may need to be met in order for the transmitter 102 to be controlled so as to reduce the strength of the IPT field 116. For example, only if both the efficiency parameter is outside the efficiency range (i.e. below the efficiency threshold) and the peak $I_{Tx}$ is outside the peak $I_{Tx}$ range (i.e. above the peak $I_{Tx}$ threshold) will the control circuitry 118 control the transmission circuitry 110 to reduce the strength of IPT field 116 (and therefore also the leakage IPT field 116a).

The values of the ranges (and corresponding thresholds) are dynamic. The value of each range/threshold may depend on the state of charging of the battery 208. For example, during the steady state the efficiency threshold may be around 25%, 30% or 40%. The peak $I_{Tx}$ threshold may be around 1.52 A. Thus, if the inductive power transmitter 102 is in the steady state and the detection circuitry 119 detects a peak $I_{Tx}$ of, for example, 1.6 A, the control circuitry 118 will determine that the peak $I_{Tx}$ is above the peak $I_{Tx}$ threshold for the steady state (1.52 A). As a result, the control circuitry 118 will determine that the peak $I_{Tx}$ parameter is outside the peak $I_{Tx}$ range (suggesting that the leakage IPT field 116a is too high), and will control the transmission circuitry 110 to reduce the power of the IPT signal (and therefore reduce the strength of the IPT field 116 and leakage IPT field 116a).

In another example embodiment, the value of each range/threshold may be dependent on one or more operating parameters of inductive power receiver 104 and/or charging circuitry 206. For example, the ranges/thresholds may be dependent on the battery charge status, charge rate (e.g., fast charging, semi-fast charging, normal charging, constant voltage (CV), etc.), and/or the magnitude of the output DC current, $I_{out}$, supplied to the charging circuitry 206 and the magnitude of the output DC voltage, $V_{out}$, supplied to the charging circuitry 206. For example, if $V_{out}$ is between 12 V and 16 V and $I_{out}$ is greater than 160 mA, then the peak $I_{Tx}$ threshold may be 1.52 A, the $I_{out}$ threshold may be 250 mA and the efficiency threshold may be 42.6%. If the control circuitry 118 determines that either peak $I_D$, is above 1.52 A, $I_{out}$ is above 250 mA or the efficiency parameter (e.g., $P_{out}/P_{in}$) is below 42.6%, then the control circuitry 118 will determine that peak $I_{Tx}$ is outside the peak $I_{Tx}$ range, $I_{out}$ is outside the $I_{out}$ range, and/or the efficiency parameter is outside the efficiency range (suggesting that the leakage IPT field 116a is too high). The control circuitry 118 may then control the transmission circuitry 110 to reduce the power of the IPT signal (and therefore reduce the strength of the IPT field 116 and leakage IPT field 116a).

The control circuitry 118 may store a look up table of the various ranges/thresholds and may determine the relevant ranges/thresholds based on the charging state, charge rate, charge status or the operating parameters of the inductive power receiver 104 (which may be detected by detection circuitry 135 and communicated to control circuitry 118 via communications circuitry 136). Alternatively or in addition, the control circuitry 118 may determine the relevant ranges/thresholds using a suitable algorithm, where the charging state, charge rate, charge status and/or the operating parameters of the inductive power receiver 104 are provided as inputs into the algorithm.

Generally speaking, for each indication/parameter, the range(s)/threshold(s) for ramp-up state(s) may be different than the range(s)/threshold(s) for steady state(s). By way of example, for a ramp up state, a first efficiency range/threshold may apply and for steady state, a second efficiency range/threshold may apply. Thus, during ramp up operation (i.e., while the transmission circuitry is increasing the IPT power towards a charge level sufficient to charge a battery at a target charge rate), if the efficiency parameter is inside the first efficiency range (i.e. above the first efficiency threshold), the transmission circuitry will continue to increase the IPT power level. However, if the efficiency parameter is outside the first efficiency range (i.e. below the first efficiency threshold), the transmission circuitry will stop increasing or reduce the IPT power. During steady state operation (i.e., after the transmission circuitry has increased the IPT power towards the charge level sufficient to charge the battery at the target charge rate), if the efficiency parameter is inside the second efficiency range (i.e. above the second efficiency threshold), the transmission circuitry will continue to produce an IPT signal at the IPT power. However, if the efficiency parameter is outside the second efficiency range (i.e. below the second efficiency threshold), the transmission circuitry will reduce the IPT power.

In the example of the preceding paragraph, the same type of indication/parameter (i.e. efficiency) is used during both ramp up and steady state. However, in some example embodiments, a different type of indication/circuit parameter may be used for each state or even during a state. For example, the efficiency parameter may be used during the ramp up state and the peak $I_{Tx}$ parameter may be used during steady state. This may arise because the control circuitry may be configured to determine whether the efficiency parameter is inside/outside the efficiency range during ramp up and to determine whether the peak $I_{Tx}$ parameters is inside/outside the peak $I_{Tx}$ range during steady state. In another example embodiment, the control circuitry 118 may determine whether both efficiency parameter is inside/outside the efficiency range and the peak $I_{Tx}$ parameters is inside/outside the peak $I_{Tx}$ range, and it may be that one parameter moves outside its respective range during ramp up (trigger a suitable response) and another parameter moves outside its respective range during steady state (triggering a suitable response).

Returning to the example of the electronic device 202 charging the portable electronic device, while the transmission circuitry 110 is increasing the IPT power towards a charge level (i.e., a ramp up state), if the control circuitry 118 determines that one or more of the indications are inside a respective first range (suggesting the leakage IPT field 116a is within allowable limits), the control circuitry 118 may control the transmission circuitry 110 to continue to increase the IPT power. As described above, each range/threshold (including the efficiency range/threshold and/or other parameter ranges/thresholds) may depend on the fact the inductive power transmitter 102 is in a ramp up state, or may depend on the charge rate of the charging circuitry 206. For example, during a ramp up state in which $V_{out}$ is between 8.5 V and 12 V and $I_{out}$ is less than 50 mA, the peak $I_{Tx}$ threshold may be 1.42 A and the efficiency threshold may be 20.5%. Therefore, provided both the detected peak $I_{Tx}$ is less than 1.42 A and the detected efficiency parameter is above 20.5%, then the IPT power will continue to increase.

While the transmission circuitry 110 is increasing the IPT power to the charge level (i.e., a ramp up state), if the control circuitry 118 determines that one or more of the indications are outside a respective first range (suggesting the leakage IPT field 116a is not within allowable limits), the control circuitry 118 may control the transmission circuitry 110 to stop increasing the IPT power or to decrease the IPT power. For example, during a ramp up state in which $V_{out}$ is between 8.5 V and 12 V and $I_{out}$ is less between 100 mA and 120 mA, the peak $I_{Tx}$ threshold may be 1.49 A and the efficiency threshold may be 34.5%. Therefore, provided either the detected peak $I_{Tx}$ is above 1.49 A or the detected efficiency parameter is below 34.5%, then the IPT power will stop increasing or be decreased.

After the transmission circuitry 110 has increased the IPT power to the charge level (i.e., a steady state), if the control circuitry 118 determines that one or more of the indications are outside a respective second range (suggesting the leakage IPT field 116a is not within allowable limits), the control circuitry 118 may control the transmission circuitry 110 to stop charging or decrease the IPT power. For example, during a steady state in which $V_{out}$ is between 6.0 V and 8.5 V and $I_{out}$ is less than 50 mA, the efficiency threshold may be 26%. Therefore, provided the detected efficiency parameter is below 26%, then the IPT power will be decreased.

After the transmission circuitry 110 has increased the IPT power to the charge level (i.e., a steady state), if the control circuitry 118 determines that one or more of the indications are inside a respective second range (suggesting the leakage IPT field 116a is within allowable limits), the control circuitry 118 may control the transmission circuitry 110 to continue to produce an IPT signal with the IPT power. For example, during a steady state in which $V_{out}$ is between 12.0 V and 16 V and $I_{out}$ is greater than 160 mA, the peak $I_{Tx}$ threshold may be 1.52 A, the $I_{out}$ threshold may be 250 mA, and the efficiency threshold may be 42.6%. Therefore, provided the detected peak $I_{Tx}$ is below 1.52 A, detected $I_{out}$ is below 250 mA, and the detected efficiency parameter is above 42.6%, then the IPT signal will continue to be produced with the IPT power.

The foregoing is merely illustrative and various modifications can be made to the described embodiments. The foregoing embodiments may be implemented individually or in any combination, and elements from one embodiment may be combined with others.

What is claimed is:

1. An inductive power transmitter comprising:
    a power transmitting coil;
    transmission circuitry coupled to the power transmitting coil and configured to produce and deliver to the power transmitting coil an inductive power transfer (IPT) signal having an IPT power, whereby the power transmitting coil generates an IPT field to transfer wireless power to a power receiving coil of an inductive power receiver;
    detection circuitry coupled to the transmission circuitry and configured to detect indications of a magnetic field strength of a leakage IPT field; and
    control circuitry responsive to the detected indications of magnetic field strength of the leakage IPT field and configured to control the transmission circuitry to maintain the magnetic field strength of the leakage IPT field within an allowable limit by:
        increasing or keeping constant a power level of an IPT signal responsive to a determination that one or more of the detected indications of magnetic field strength suggest that the leakage IPT field is within the allowable limit; and reducing or stopping the IPT power responsive to a determination that one or more of the detected indications of magnetic field strength suggest the leakage IPT field has exceeded the allowable limit.

2. The inductive power transmitter defined in claim 1 wherein the indications of magnetic field strength of the leakage IPT field comprise one or more circuit parameters selected from the group consisting of:
an efficiency parameter indicative of an efficiency of wireless power transfer;
a peak magnitude of a transmitting AC current supplied to the transmitting coil;
an RMS magnitude of a transmitting AC current supplied to the transmitting coil;
a peak magnitude of a receiving AC current output by the receiving coil;
an RMS magnitude of a receiving AC current output by the receiving coil; and
a magnitude of an output DC current output by the inductive power receiver.

3. An inductive power transmitter comprising:
a power transmitting coil;
transmission circuitry coupled to the power transmitting coil and configured to produce and deliver to the power transmitting coil an inductive power transfer (IPT) signal having an IPT power, whereby the power transmitting coil generates an IPT field to transfer wireless power to a power receiving coil of an inductive power receiver;
detection circuitry coupled to the transmission circuitry and configured to detect indications of a magnetic field strength of a leakage IPT field; and
control circuitry responsive to the detected indications of magnetic field strength of the leakage IPT field and configured to control the transmission circuitry to maintain the leakage IPT field within an allowable limit while the transmission circuitry is increasing the IPT power towards a charge level sufficient to charge a battery associated with the inductive power receiver at a target charge rate by:
responsive to determining that a first indication of magnetic field strength of the leakage IPT field is inside a respective first range, suggesting that the leakage IPT field is within the allowable limit, continuing to increase the IPT power; and
responsive to determining that the first indication is outside the respective first range, suggesting that the leakage IPT field has exceeded the allowable limit, stopping increasing or reducing the IPT power;
responsive to determining that a second indication of magnetic field strength of the leakage IPT field is outside a respective second range, suggesting that the leakage IPT field has exceeded the allowable limit, reducing the IPT power; and
responsive to determining that the second indication is inside the respective second range, suggesting that the leakage IPT field is within the allowable limit, continuing to produce the IPT signal at the charge level.

4. The inductive power transmitter defined in claim 3 wherein the first indication of magnetic field strength of the leakage IPT field and the second indication of magnetic field strength of the leakage IPT field correspond to a same type of circuit parameter.

5. The inductive power transmitter as defined in claim 3 wherein the first indication of magnetic field strength of the leakage IPT field and the second indication of magnetic field strength of the leakage IPT field correspond to a different type of circuit parameter.

6. The inductive power transmitter as defined in claim 3 wherein the respective first range is different to the respective second range.

7. The inductive power transmitter as defined in claim 6 wherein each range is dependent on at least one of: a state of charging of the battery, the charge rate, a magnitude of an output DC current output by the inductive power receiver and a magnitude of an output DC voltage output by the inductive power receiver.

8. The inductive power transmitter as defined in claim 7 wherein the control circuitry determines each range from a lookup table or using an algorithm.

9. The inductive power transmitter as defined in claim 7 wherein the efficiency parameter is determined to be inside a respective efficiency range if the efficiency parameter is above a respective efficiency threshold.

10. The inductive power transmitter as defined in claim 9 wherein the respective efficiency threshold is dependent on at least one of: a state of charging of the battery, the charge rate, a magnitude of an output DC current output by the inductive power receiver and a magnitude of an output DC voltage output by the inductive power receiver.

11. The inductive power transmitter as defined in claim 10 wherein each respective efficiency threshold is between about 20% and 45%.

12. The inductive power transmitter defined in claim 9 wherein the efficiency parameter is detected based on a magnitude of an input DC power supplied to the transmission circuitry and a magnitude of an output DC power output by the inductive power receiver.

13. The inductive power transmitter defined in claim 12 wherein each further circuit parameter is determined to be inside a respective further parameter range if the further circuit parameter is below a respective further parameter threshold, wherein each respective further parameter threshold is dependent on at least one of: a state of charging of the battery, the charge rate, a magnitude of an output DC current output by the inductive power receiver and a magnitude of an output DC voltage output by the inductive power receiver.

14. The inductive power transmitter defined in claim 1 wherein the inductive power transmitter is configured to communicate with the inductive power receiver, and to receive indications of operating parameters of the inductive power receiver from the inductive power receiver.

15. The inductive power transmitter defined in claim 14 wherein the inductive power transmitter is configured to communicate with the inductive power receiver using in-band communications injected or combined into the wireless power signals.

16. The inductive power transmitter defined in claim 6 wherein reducing the IPT power includes stopping power transfer.

17. The inductive power transmitter as defined in claim 6 wherein the target charge rate is between 5C to 15 C.

18. A method of controlling an inductive power transmitter, the method comprising:
detecting indications of a magnetic field strength of a leakage inductive power transfer (IPT) field of the inductive power transmitter;
controlling transmission circuitry of the inductive power transmitter responsive to the detected indications of the magnetic field strength of the leakage IPT field to maintain the magnetic field strength of leakage IPT field within an allowable limit by:

responsive to a determination that one or more of the detected indications of magnetic field strength suggest that the leakage IPT field is within the allowable limit, increasing or keeping constant a power level of an IPT signal; and responsive to a determination that one or more of the detected indications of magnetic field strength suggest the leakage IPT field has exceeded the allowable limit, reducing or stopping the IPT power.

* * * * *